US00RE38528E

(19) United States
(12) Reissued Patent
Glynn et al.

(10) Patent Number: US RE38,528 E
(45) Date of Reissued Patent: Jun. 8, 2004

(54) ALARM CLOCK WITH TIME ACTIVATED AND SPEED CONTROLLED VEHICLE DEVICE

(75) Inventors: Alex P. Glynn, Raritan Township, NJ (US); Kenneth P. Glynn, Raritan Township, NJ (US)

(73) Assignee: E. Mishan & Sons, Inc., New York, NY (US)

(21) Appl. No.: 10/026,595

(22) Filed: Dec. 19, 2001

Related U.S. Patent Documents

Reissue of:
(64) Patent No.: 6,034,591
Issued: Mar. 7, 2000
Appl. No.: 09/039,129
Filed: Mar. 13, 1998

(51) Int. Cl.[7] ..... G08B 1/00
(52) U.S. Cl. ..... 340/309.8; 368/45; 368/72; 368/205; 368/274; 368/251
(58) Field of Search ..... 340/309.15, 309.4, 340/384.1; 368/12, 45, 64, 72, 203–205, 244, 274, 327, 251

(56) References Cited

U.S. PATENT DOCUMENTS

| | | | | | |
|---|---|---|---|---|---|
| 3,050,168 | A | | 8/1962 | Kemp | 194/222 |
| 3,184,911 | A | | 5/1965 | Canale et al. | 368/24 |
| 3,611,151 | A | * | 10/1971 | Fernandez | 369/6 |
| 4,103,484 | A | | 8/1978 | Bailey | 368/76 |
| 4,821,247 | A | * | 4/1989 | Grooms | 368/10 |
| 5,047,998 | A | | 9/1991 | Aizawa et al. | 368/75 |
| D320,943 | S | | 10/1991 | Harsch | D10/12 |
| 5,226,021 | A | * | 7/1993 | Dell'Olio | 368/12 |
| 5,258,963 | A | * | 11/1993 | Yao | 368/10 |
| 5,299,178 | A | | 3/1994 | Belik | 368/76 |
| 5,311,488 | A | * | 5/1994 | Trantham | 368/12 |
| 5,369,797 | A | * | 11/1994 | Tyree | 368/10 |
| D355,856 | S | | 2/1995 | Dawson | D10/11 |
| 5,506,819 | A | * | 4/1996 | Chen | 368/273 |
| D373,314 | S | | 9/1996 | Staszak | D10/8 |
| 5,555,536 | A | * | 9/1996 | Rolf et al. | 340/309.15 |

* cited by examiner

*Primary Examiner*—Daniel J. Wu
*Assistant Examiner*—Sihong Huang
(74) *Attorney, Agent, or Firm*—Notaro & Michalos P.C.

(57) ABSTRACT

The present invention is an alarm clock device which programmably and automatically coordinates the movement of one or more electric toy trains, or the like. The present invention alarm clock preferably triggers the movement of an electric toy train when a pre-set alarm time is reached. The alarm clock device comprises at least one base that defines an elongated substantially non-linear track for regulating the movement of a toy train. The traveling speed of the train is preferably regulated by a voltage varying device, such as a transformer, that is attached to the track and also coupled to a manually adjustable speed controlling member within the alarm clock. The movement of the train is preferably accompanied by applicable audible sounds that correspond therewith. The duration of movement may be programmed manually and may be adjusted in any variety of ways.

21 Claims, 4 Drawing Sheets

ALARM CLOCK WITH TIME ACTIVATED AND SPEED CONTROLLED VEHICLE DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to programmable alarm clocks, and more particularly to programmable alarm clocks which automatically coordinate the movement of at least one electric vehicle coupled therewith.

2. Information Disclosure Statement

Conventional alarm clocks come in a variety of shapes and sizes and function in a variety of ways. The intent of many such alarm clocks is to provide a convenient means for waking the user from a sleeping state. The pertinent prior art discloses alarm clocks which incorporate, for example, radio receivers and cassette players.

In addition, the prior art also discloses alarm clocks which incorporate an accompanying vehicle which is triggered into motion along a linear track when a predetermined alarm time is reached. The following samples represent different variations of alarm clocks which exemplify the art.

U.S. Pat. No. 5,311,488 to Herbert B. Trantham teaches an alarm clock which coordinates mechanical motion or action, with a distinctive sound, of an object such as a train engine between end stops when an alarm clock reaches a set alarm time. When the moving object reaches a front end stop of a linear track, sound is terminated and a regular alarm clock signal is enabled.

U.S. Pat. No. 3,611,151 to Jose F. Fernandez teaches an electric alarm clock with a radio and a cartridge-type tape receptacle and playback head mechanism. Also included are awake and sleep switches and a selector switch for selectively operating the radio or the tape mechanism in the morning and in the evening.

Notwithstanding the prior art in this field, it is believed that the present invention, which comprises a programmable alarm clock which automatically and adjustably coordinates the duration of movement and the speed of one or more vehicles, as described herein, is neither taught nor rendered obvious.

SUMMARY OF THE INVENTION

The present invention is an alarm clock device which programmably and automatically coordinates the movement of one or more electric toy trains, or the like. The present invention alarm clock preferably triggers the movement of an electric toy train when a pre-set alarm time is reached. The alarm clock device comprises at least one base that defines an elongated substantially non-linear loop track for regulating the movement of a toy train. The traveling speed of the train is preferably regulated by a voltage varying device, such as a transformer, that is attached to the track and also coupled to a manually adjustable speed controlling member within the alarm clock. The movement of the train is preferably accompanied by applicable audible sounds that correspond therewith. The duration and speed of movement may be programmed manually and may be adjusted in any variety of ways.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The present invention is an alarm clock device which programmably and automatically coordinates the movement of at least one electric toy vehicle. The present invention generally comprises a conventional alarm clock which preferably triggers the movement of an electric toy train when a pre-set alarm time is reached. The alarm clock is connected to a base that defines at least one elongated substantially non-linear loop track for regulating the movement of a toy train or the like. The traveling speed of the train may vary and is preferably regulated by a voltage varying device, such as a transformer, that is attached to the track and also coupled to a speed control member, e.g. a CPU or microprocessor, located within the alarm clock. The movement of the train is preferably accompanied by applicable audible sounds that correspond therewith, i.e train whistles and human conductor voices. The duration of movement may be programmed manually and may be adjusted in any variety of ways.

Figure 1:
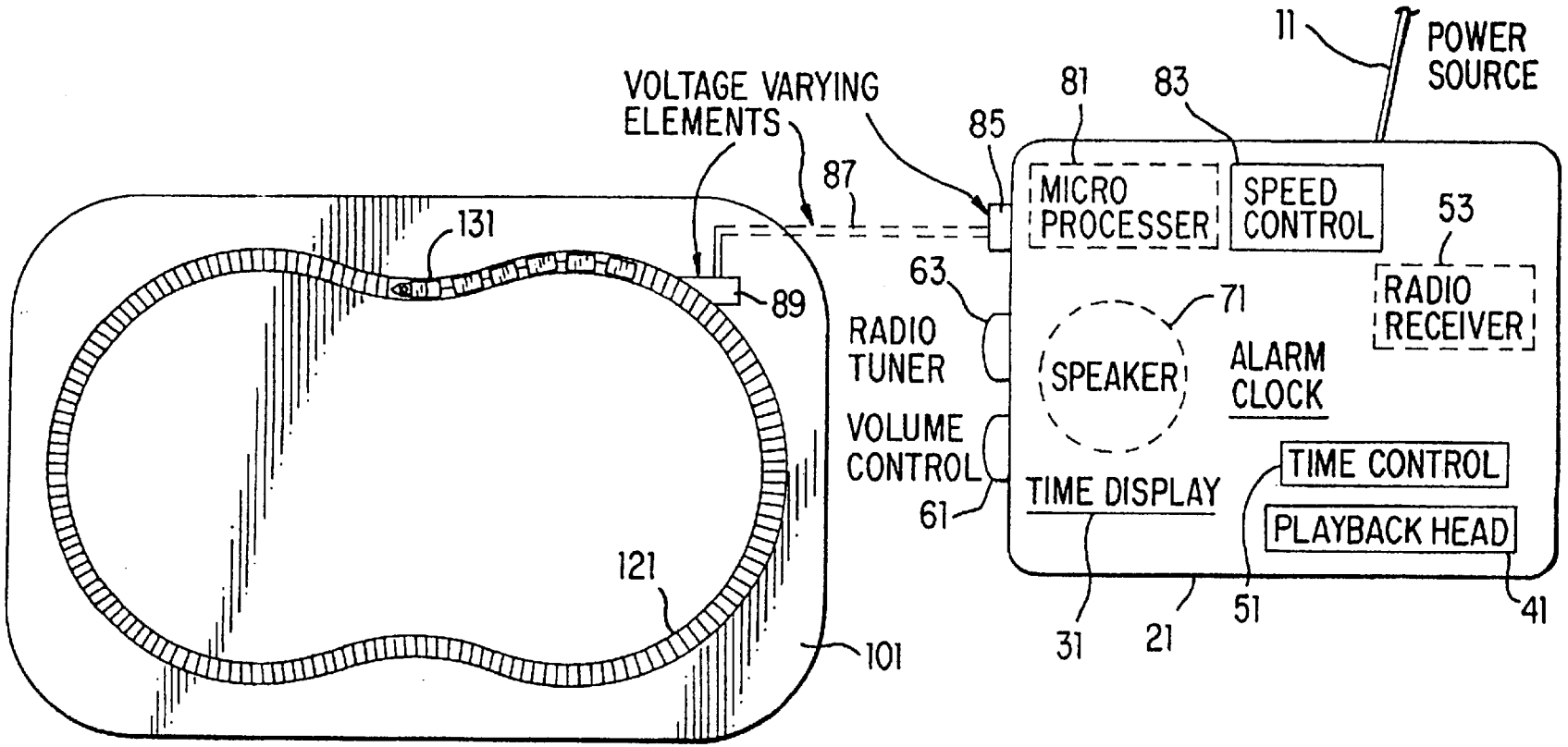
FIG. 1 shows a top view of a present invention alarm clock and base with a single track and train connected thereto.

FIG. 1 shows a top view of a present invention alarm clock and base with a single track and train connected thereto. Here, conventional alarm clock 21 is connected to power source 11. Alarm clock 21 comprises a time display member 31 and has a cartridge-type tape receptacle and playback head unit 41. Alarm clock 21 comprises time control members 51 which allow a user to set the actual time, the alarm time, the date and otherwise. Alarm clock 21 further comprises radio receiver member 53 and radio tuner member 63. Volume control member 61 permits a user to control the volume yield propagated by speaker 71. Alarm clock 21 also comprises microprocessor unit 83 and speed control members 83. Microprocessor unit 83 and speed control members 83 work concurrently to allow a user to manually regulate the motion of train 131 along track 121 which is defined by base 101. Preferably, microprocessor 81 and speed control members 83 allow a user to activate or deactivate the motion of train 131. In other words, a user sets the alarm to activate at a specified time and when that time is reached, the alarm is represented by movement of train 131 and by the clamor of locomotive cacophony from speaker 71. Preferably, microprocessor 81 is programmed to alter the speed of train 131 along track 121 by controlling electrical current through voltage varying elements 85, 87 and 89, shown here as conductive electrical wire and transformers. These voltage varying elements may be a single transformer with conductive wire or may be any other commercial type of voltage regulator member. Thus, when an alarm time is reached, train 131 will begin movement along track 121 and will be accompanied by pre-programmed locomotive whistles. There may even be a human voice accompaniment. Microprocessor 81 and speed control member 83 also allow a user to determine the duration of movement of train 131. In essence, a user may preferably determine the speed and distance of travel along track 121, thereby allowing the user to adjust the alarm to an infinite number of different patterns.

Figure 2:
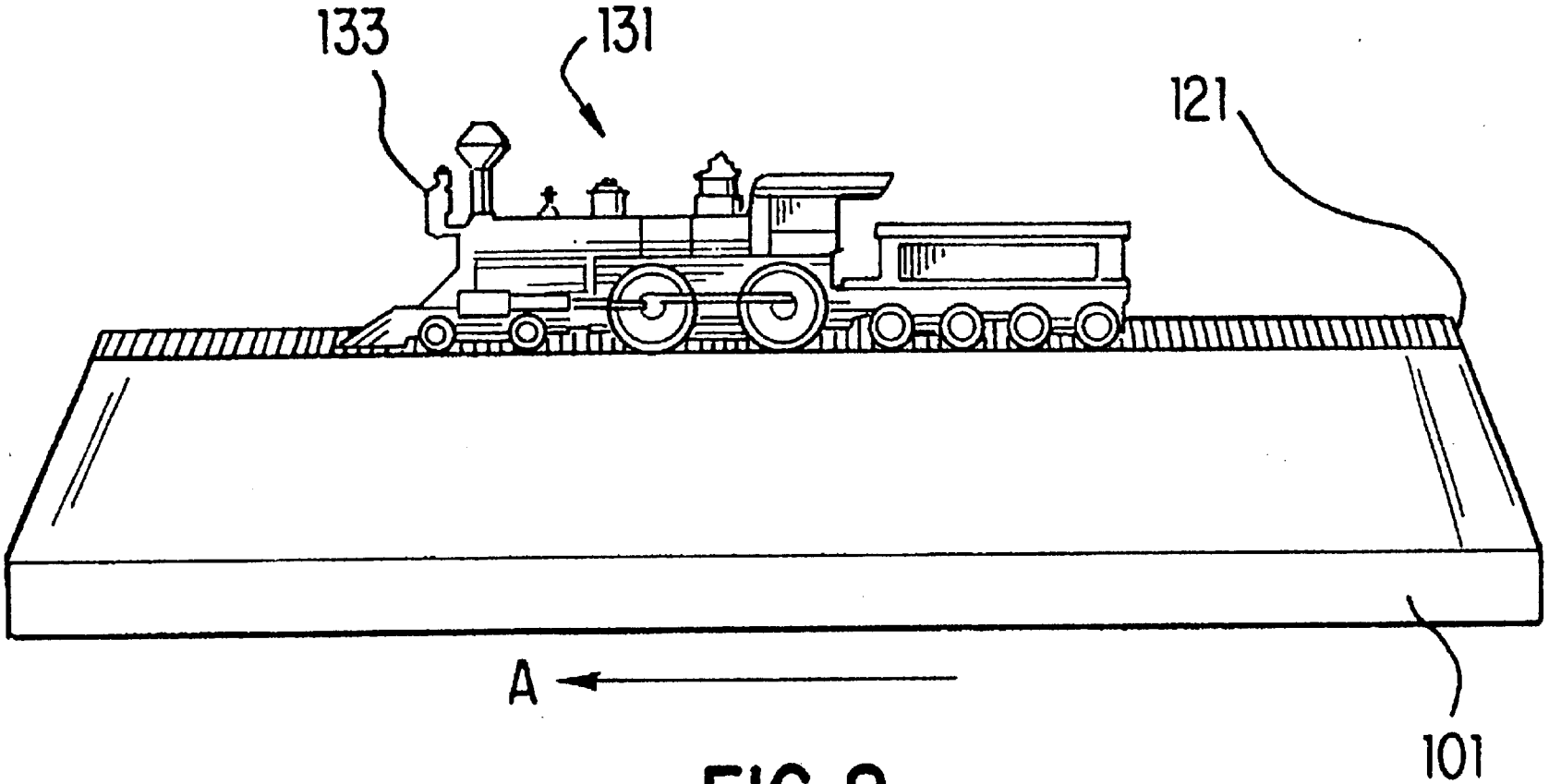
FIG. 2 shows a partial view of a segment of base 101 illustrating details of track 121 and train 131.

FIG. 2 shows a partial view of a segment of base 101 illustrating details of track 121 and train 131. Here, train 131 is shown moving in direction A along track 121. As shown, track 121 provides electrical current received from the voltage varying elements (not shown) to train engine 133 which then pulls the rest of the train along track 121. It should be noted that FIG. 2 is merely descriptive and that any type of train locomotion may be employed without exceeding the scope of the present invention. In other words, neither the specific style of train used nor the type of train engine will not alter its application within the scope the present invention.

Figure 3:
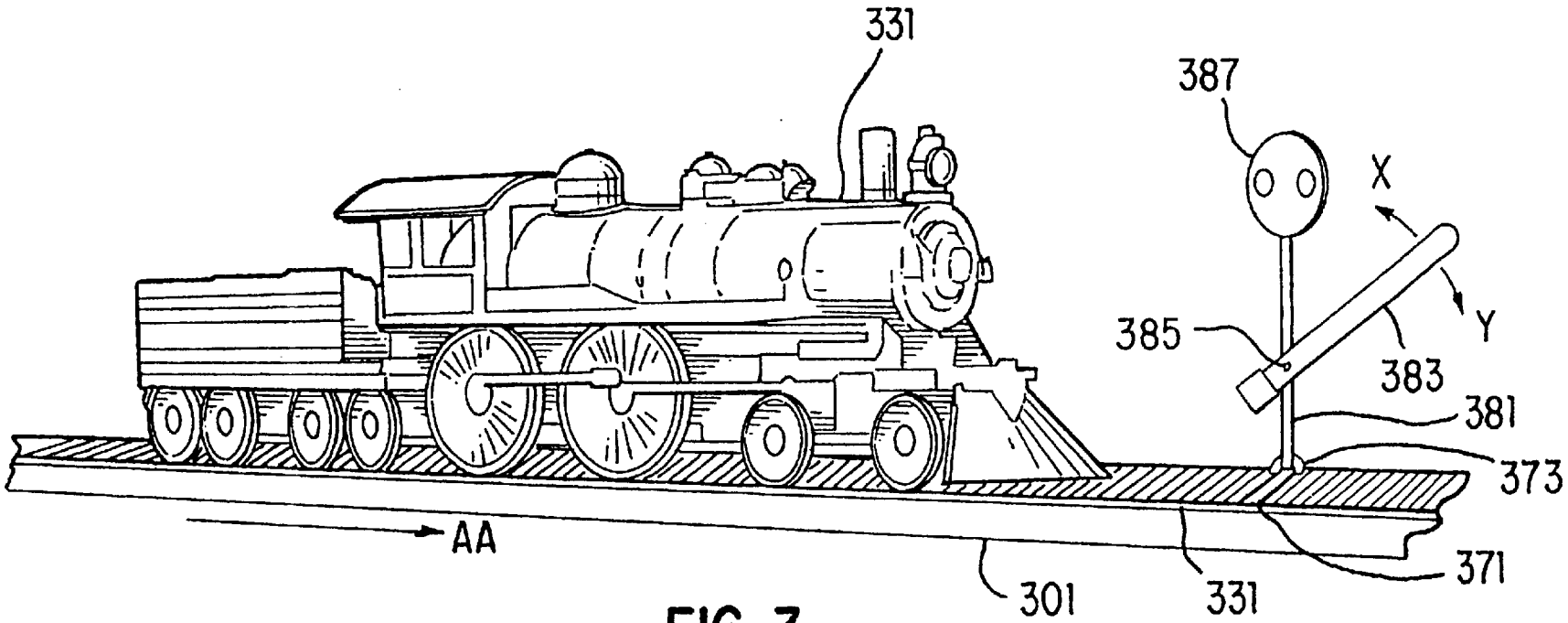
FIG. 3 shows a partial view of a segment of an alternative embodiment base illustrating details of a train and track embodiment.

FIG. 3 shows a partial view of a segment of an alternative embodiment base illustrating details of a train and track embodiment. Here, base 301 defines track 321. Preferably, when the alarm time is reached, train 331 begins movement in direction AA along track 321. Here, base 301 employs checkered guard rail crossing unit 371 which is fastened to base 301 by securing means 373. Guard rail unit 371 is manually fastened in place at a point along base 301 to authenticate and define an alarm ceasing or an alarm finish point. When train 331 reaches guard rail unit 371, rail 383 begins pivotal movement in directions X and Y along pivot point 385 which is defined within rail post 381. Guard rail unit 371 may function with the microprocessor to illustrate the cessation of each race. When a specified interval of time has elapsed, rail 383 ceases movement and train 331 may be automatically moved into a pre-determined start position along track 321. In the alternative, a user may manually place the train into such a designated start position.

It is to be understood that the particular train vehicle may be any variety and still be within the scope of the present invention. It is also to be understood that the duration of the vehicle movement and the speed thereof may greatly vary within the scope of the present invention.

Figure 4:
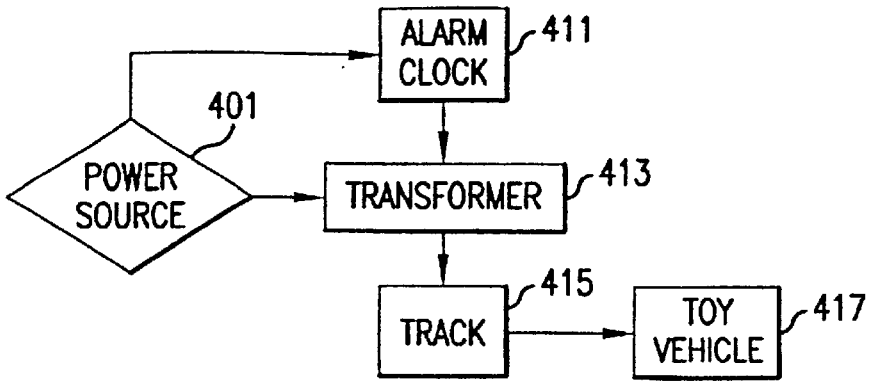
FIG. 4 shows an example of a flow diagram illustrating a power flow sequence as employed by an embodiment of a present invention alarm clock device.
Figure 5:
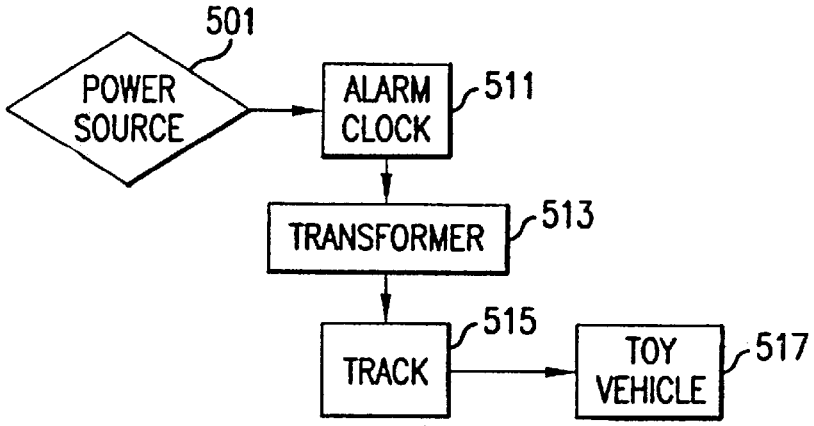
FIG. 5 shows another example of a flow diagram illustrating a power flow sequence as employed by an alternative embodiment of a present invention alarm clock device.
Figure 6:
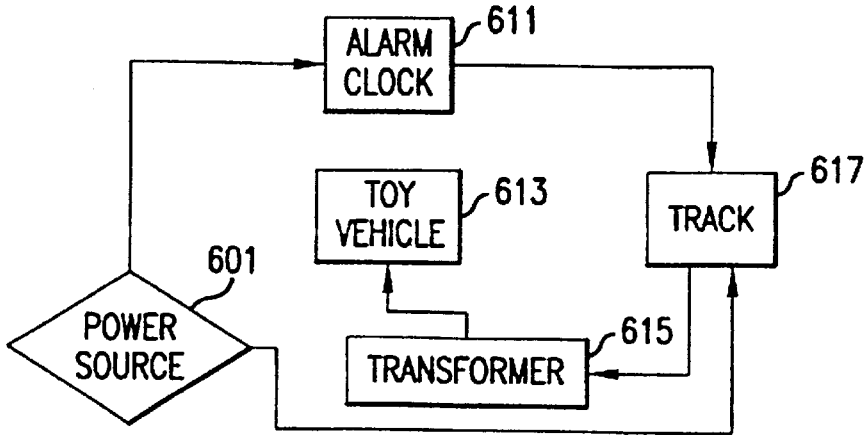
FIG. 6 shows another example of a flow diagram illustrating a power flow sequence as employed by another alternative embodiment of a present invention alarm clock device.

Referring to FIGS. 4, 5 and 6, three alternative power flow diagrams are shown. FIG. 4 shows a flow diagram wherein a power source 401, e.g. an A/C power source, battery power source and/or solar power source, is coupled directly to alarm clock 411 and to transformer 413. Transformer 413 then converts the high voltage current derived from the power source into lower voltage current which is then sent to track 415. Toy vehicle 417 then derives power from track 415.

FIG. 5 shows a flow diagram wherein a power source 501, e.g. an A/C power source, battery power source and/or solar power source, is coupled directly to alarm clock 511. Alarm clock 511 then conveys power to transformer 513 which conveys the converted current directly to track 515. Toy vehicle 517 then derives power from track 515.

FIG. 6 shows a flow diagram wherein a power source 601, e.g. an A/C power source, battery power source and/or solar power source, is coupled directly to alarm clock 611 and to track 617. Track 617 then conveys power to transformer 615 which conveys the converted current directly to toy vehicle 613. It should be understood that FIGS. 4 through 6 are representative of only a few examples of a present invention power flow configuration. In other words any number of variations are possible. For example, a battery powered vehicle may be used in conjunction with a track that is not powered at all. Likewise, a mixture of power sources may be used together, i.e. a solar powered alarm clock and an A/C powered track and vehicle. Thus, FIGS. 4 through 6 are meant to merely illustrate possible variations of power supply and coupled configuration for the present invention and should not limit the scope of the present invention.

Obviously, numerous modifications and variations of the present invention are possible in light of the above teachings. It is therefore understood that within the scope of the appended claims, the invention may be practiced otherwise than as specifically described herein.

What is claimed is:

1. A programmable alarm clock device comprising:

(a) a clock having means for displaying time, said clock also having means for producing a time-activated alarm, means for programming a pre-selected alarm time, and means for activating motion of a toy vehicle on a track in response to alarm activation;

(b) means for defining at least one continuous loop toy track, said track being coupled to said alarm clock;

(c) means for connecting an A/C power source to said programmable alarm clock device, said power source connecting means being connected to said track so as to power said toy vehicle;

(d) at least one vehicle adapted for movement along said track, wherein when the alarm of said alarm clock is activated, said vehicle is activated to motion; and (e) a transformer adapted for varying voltage and regulating movement of said vehicle, said transformer being adapted to functionally operate concurrently with said motion activating means, said transformer being coupled to said track and to said alarm clock.

2. The programmable alarm clock device of claim 1 wherein said clock comprises a radio receiver, means for tuning said radio receiver, means for producing audible sound received by said radio receiver, and means for increasing and decreasing volume of said audible sound.

3. The programmable alarm clock device of claim 1 wherein said motion activating means is microprocessor adapted to initiate and terminate movement of said vehicle.

4. The programmable alarm clock device of claim 1 wherein said vehicle is a train.

5. The programmable alarm clock device of claim 4 wherein said alarm comprises audible locomotive tones.

6. The programmable alarm clock device of claim 5 wherein said alarm comprises human voice accompaniment.

7. The programmable alarm clock device of claim 1 wherein said alarm clock device comprises a cartridge cassette receptacle and playback head and comprises means for producing audible sound received by said play back head, and means for increasing and decreasing volume of said audible sound.

8. The programmable alarm clock device of claim 1 wherein said alarm clock device comprises means for signalling the cessation of movement of said vehicle.

9. The programmable alarm clock device of claim 8 wherein said signalling means is a rail road crossing guard member, said crossing guard member being adjustably attached to said track and being adapted for appropriate pivotal movement.

10. A programmable alarm clock device comprising:

(a) a clock having means for displaying time, said clock also having means for producing a time-activated alarm, means for programming a pre-selected alarm time, and means for activating motion of a toy vehicle on a track in response to alarm activation;

(b) means for defining at least one continuous loop toy track, said track being coupled to said alarm clock;

(c) means for connecting a battery power source to said programmable alarm clock device, said power source connecting means being connected to said track so as to power said toy vehicle;

(d) at least one vehicle adapted for movement along said track, wherein when the alarm of said alarm clock is activated, said vehicle is activated to motion; and (e) a transformer adapted for varying voltage and regulating movement of said vehicle, said transformer being adapted to functionally operate concurrently with said motion activating means, said transformer being coupled to said track and to said alarm clock.

11. The programmable alarm clock device of claim 10 wherein said motion activating means is microprocessor adapted to initiate and terminate movement of said vehicle.

12. The programmable alarm clock device of claim 10 wherein said vehicle is a train.

13. The programmable alarm clock device of claim 12 wherein said alarm comprises audible locomotive tones.

14. The programmable alarm clock device of claim 13 wherein said alarm comprises human voice accompaniment.

15. The programmable alarm clock device of claim 10 wherein said alarm clock device comprises a cartridge cassette receptacle and playback head and comprises means for producing audible sound received by said play back head, and means for increasing and decreasing volume of said audible sound.

16. A programmable alarm clock device comprising:

(a) a clock having means for displaying time, said clock also having means for producing a time-activated alarm, means for programming a pre-selected alarm time, and means for activating and deactivating motion of a toy vehicle on a track in response to alarm activation and deactivation;

(b) means for defining at least one continuous loop toy track, said track being coupled to said alarm clock;

(c) means for connecting a solar power source to said programmable alarm clock device, said power source connecting means being connected to said track so as to power said toy vehicle;

(d) at least one vehicle adapted for movement along said track, wherein when the alarm of said alarm clock is activated, said vehicle is activated to motion; and (e) a transformer adapted for varying voltage and regulating movement of said vehicle, said transformer being adapted to functionally operate concurrently with said motion activating means and motion deactivating means, said transformer being coupled to said track and to said alarm clock.

17. The programmable alarm clock device of claim 16 wherein said motion activating means and motion deactivating means is a microprocessor adapted to initiate and terminate movement of said vehicle.

18. The programmable alarm clock device of claim 16 wherein said vehicle is a train.

19. The programmable alarm clock device of claim 16 wherein said alarm comprises audible locomotive tones.

20. The programmable alarm clock device of claim 16 wherein said alarm clock device comprises means for signalling the cessation of movement of said vehicle.

*21. A programmable alarm clock device comprising:*

*a base;*

*an alarm clock connected to said base, said alarm clock having means for displaying time, said alarm clock also having means for producing a time-activated alarm that includes audible sounds that correspond to a toy, means for programming a pre-selected alarm time, and means for activating movement of a toy along an endless, non-linear and continuous loop toy track in response to time-activation of the alarm;*

*an endless, non-linear and continuous loop toy track on said base, said track being coupled to said alarm clock;*

*at least one toy mounted for movement along said endless, non-linear and continuous loop toy track, audible sounds corresponding to the toy;*

*a power supply connected to said alarm clock for powering said alarm clock and for powering movement of said toy along said track, said power supply being selected from the group consisting of: an a/c power supply; a battery power supply; and a solar power supply; and*

*said means for activating movement when the alarm of said alarm clock is activated, causing said toy to move for any selected duration of time along said endless, non-linear and continuous loop track and generating said audible sounds.*

* * * * *